May 8, 1962 G. A. LYON 3,033,328
BRAKE DRUM COOLING RING STRUCTURE
Filed June 11, 1958
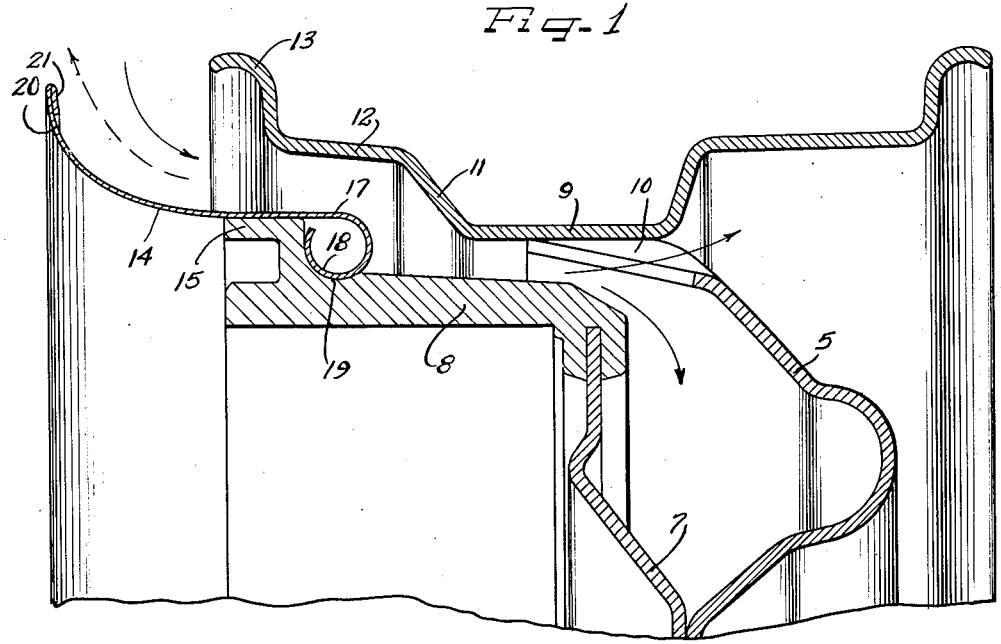
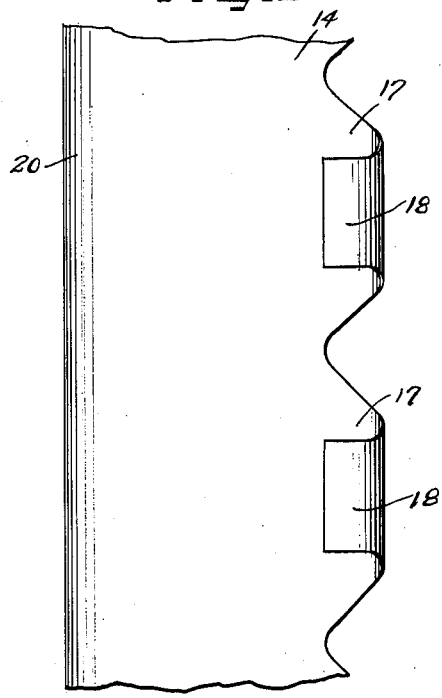
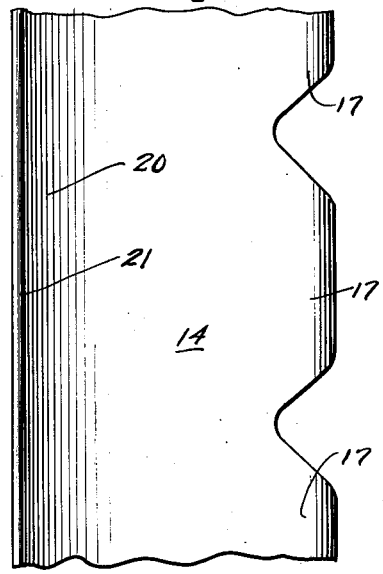
Inventor
George Albert Lyon

United States Patent Office 3,033,328
Patented May 8, 1962

3,033,328
BRAKE DRUM COOLING RING STRUCTURE
George Albert Lyon, Detroit, Mich., assignor to Lyon Incorporated, Detroit, Mich., a corporation of Delaware
Filed June 11, 1958, Ser. No. 741,405
6 Claims. (Cl. 188—264)

The present invention relates to improvements in means for cooling brake drums of vehicles such as automobiles.

In the high speed running of a vehicle, the brakes have a tendency to become overheated where inadequate cooling for the brake drum is provided. Numerous factors contribute to this, such as crowded space relationships, small size wheels compared to width substantially isolating the brake drum from slipstream air, larger brake drum braking area, and the like.

An important object of the present invention is to provide improved means for effecting air movement in cooling relation over a brake drum.

Another object of the invention is to provide an improved ring type of device for brake drum cooling.

A further object of the invention is to provide improved snap-on means for brake drums to assist in effecting cooling circulation of air over the brake drum.

A further problem encountered in brake drums of vehicles resides in development of high frequency vibrations during application of the brakes resulting in disagreeable, squealing noises.

It is therefore a further object of the invention to provide an improved vibration damping means for brake drums.

Yet another object of the invention is to provide combined brake drum cooling and vibration damping means for brake drums.

Other objects, features and advantages of the present invention will be readily apparent from the following detailed description of a preferred embodiment thereof taken in conjunction with the accompanying drawings, in which:

FIGURE 1 is a fragmentary radial sectional detail view through a vehicle wheel and brake drum assembly including a brake drum and cooling vibration damping device according to the present invention;

FIGURE 2 is a radially inner side elevational view of a fragmentary portion of the combination brake drum cooling and vibration damping ring of FIGURE 1; and FIGURE 3 is a radially outer side elevational view of a fragmentary portion of the ring.

The present invention is adapted to be utilized in connection with a vehicle wheel including a disk spider wheel body 5 suitably attached to a flange portion 7 of a brake drum 8 within which suitable braking means not shown are adapted to be operative and which in the course of operation tend to effect substantial frictional heat in the brake drum. Supported marginally by the wheel body 5 is a multi-flange, drop center tire rim having a base flange 9 with which the margin of the wheel body in the present instance provides wheel openings 10 through which air may circulate. On the axially inner portion of the tire rim a series of flanges including a side flange 11, an intermediate flange 12 and a terminal flange 13 provide a gap about the periphery of the brake drum 8 through which air may circulate about the brake drum and through the wheel openings 10. However, it will be observed that the brake drum 8 is entirely encompassed by the tire rim in the present instance and this creates a problem of properly cooling the brake drum in the running of the associated wheel.

According to the present invention, improved means are provided for not only effecting circulation of air in cooling relation over and about the brake drum 8, but also to damp vibrations in the brake drum. To this end, a preferably sheet material ring member 14 is provided which may be made from sheet metal, but may also be formed from suitable synthetic plastic material if preferred. In a preferred construction, the ring member 14 includes a generally axially extending body portion which is of a minimum diameter to fit at least reasonably closely though not necessarily tightly about an axially inner marginal radially outwardly projecting annular rib 15 on the brake drum 8. Although the projection structure 15 is shown as a rib, it may if preferred comprise a plurality of circumferentially spaced projections.

At its axially outer margin, the ring member 14 has means for press-on engagement with the brake drum for retaining the ring in proper axial disposition relative to the brake drum. In the present instance, such means comprise a series of axially outward retaining finger extensions 17 each of which is provided with a radially inwardly turned and curled loop-like retaining terminal 18 of resilient form which is adapted to engage in snap-on relation within a radially outwardly opening groove 19 formed in the outer periphery of the brake drum 8 preferably contiguous the rib 15. Normally the resilient finger terminals 18 extend to a slightly smaller diameter than the diameter within the groove 19 so that in applying the ring to the brake drum by a generally axially inward relative assembly movement, the terminals 18 are curlingly resiliently compressed and slightly deflected radially outwardly until they snap into the groove 19 and therein they expand and effect a resilient gripping engagement. There may be as many or as few of the retaining fingers 17 and terminals 18 as preferred circumferentially spaced about the axially outer margin of the ring member 14. It will be observed also that the body portions of the fingers 17 where they project from the edge of the ring member 14 are of flaring form so that the body portions are substantially stiffer than the terminal portions 18.

The particular construction and relationship of the resilient fingers 17, 18 relative to the engaged portion of the brake drum 8 is such that there is a highly advantageous and efficient sound damping effect since the individual fingers are substantially out of phase vibrationally relative to the brake drum, and being in substantial number effectively damp sound producing vibrations of the brake drum.

At its axially inner margin, the ring member 14 is preferably formed on a generally radially outwardly projecting scoop-like curvature to provide a scoop margin 20 that in assembly with the brake drum projects substantially axially inwardly beyond and in overlying relation to the tire rim and more particularly the terminal flange 13 to afford a substantial radially opening air scoop gap therewith. At its extremity the marginal scoop portion 20 is turned under to provide a reinforcing and finishing flange 21.

In operation as the wheel turns and moves forwardly with the vehicle, air is scooped in by the ring member 14 as indicated by the solid directional arrows in FIGURE 1 and such air then moves into the gap between the brake drum and the tire rim and in cooling circulation over the brake drum 8, some of the air moving on through the wheel openings 10 while additional air may move toward the rear portion of the wheel considered with respect to the direction of movement of the vehicle. At the rear of the wheel, the air that circulates rearwardly over the brake drum 8 may move out through the gap between the ring member 14 and the tire rim as indicated by the broken directional arrow in FIGURE 1. In fact, the ring member 14 at the rear of the wheel has an aspirating effect especially in high speed operation where the slipstream air moves rapidly past the edge of the marginal portion 20 at the rear of the wheel.

Snap-on mounting of the ring member 14 may readily be effected with respect to the brake drum 8 before the wheel is attached to the flange associated with the brake drum and then is self-retaining with respect to the brake drum. If it is desired for any reason to remove the ring member 14 that can readily be done by removing the wheel and then snapping the retaining finger terminal portions 18 out of the groove 19 by relative axial pressure whereby the ring member 14 moves axially outwardly relative to the brake drum 8.

It will be understood that modifications and variations may be effected without departing from the scope of the novel concepts of the present invention.

I claim as my invention:

1. In a wheel structure including a brake drum and a tire rim encompassing the same in air gap relation, a cooling ring member engaged about the axially inner portion of the brake drum and projecting axially inwardly therefrom, the axially outer portion of the ring having a series of return-bent resiliently flexible curled retaining fingers turned generally radially inwardly into loops and engaging under expanded resilient grip within a groove in the outer periphery of the brake drum, said fingers being curlingly resiliently compressible for snapping into the groove from a compressed smaller diameter of the individual curled finger loops during assembly of the ring member with the brake drum.

2. In a wheel structure including a brake drum encompassed by a tire rim in air gap relation, the brake drum having an outer peripheral radially outwardly opening groove in the axially inner portion thereof, and a brake drum cooling ring member encompassing the axially inner portion of the brake drum and having an axially outer marginal series of spring retaining fingers each of which has a curled loop terminal engaged in snap-in relation within said groove to retain the ring in axial disposition on the brake drum.

3. In a cooling ring structure for disposition about a brake drum, a generally axially extending annular sheet material body having a generally radially out turned axially inner marginal portion and provided on the axially outer margin thereof with a plurality of curled loop-like retaining fingers which are curled and expansible and contractible to project generally radially inwardly and adapted to snap into a groove in the periphery of the brake drum, said fingers having flaring body portions which are stiffer than resilient curved terminal portions of the fingers.

4. In a cooling ring structure for disposition about a brake drum, a generally axially extending annular sheet material body having a generally radially out turned axially inner marginal portion and provided on the axially outer margin thereof with a plurality of curved retaining fingers adapted to snap into a groove in the periphery of the brake drum, said fingers comprising curled loop-like resiliently flexible terminal portions projecting generally radially inwardly and adapted to be curlingly compressed and thereby flexibly deflected to a larger diameter than the normal diameter to which they project.

5. In a wheel structure including a brake drum having an axially inner marginal portion and a tire rim mounted in encircling gap relation about the brake drum, the brake drum having in said axially inner marginal portion a radially outwardly opening groove generally confronting said tire rim and defined by axially spaced generally opposed annular boundaries, and an air deflecting ring member having a generally axially extending annular body portion of a diameter to encircle said marginal portion of the brake drum closely and in spaced air gap relation to the tire rim, the axially outer end portion of said body having thereon a circumferential series of generally radially inwardly extending resilient finger members having terminal portions thereof firmly engaging in said groove and with said groove boundaries to thereby maintain the ring member in axial position relative to the brake drum and the tire rim and against unintentional axial displacement in either axial direction, said ring body having an axially inner portion extending generally axially inwardly and radially outwardly substantially beyond said drum margin and into overlying gap relation to the tire rim and providing with the tire rim a radially outwardly opening annular mouth of substantial width leading to the gap between the drum and ring member and the tire rim, said mouth being maintained positively by the positive axial retention of the ring member through engagement of the finger members in said groove.

6. In a cooling ring structure for disposition about a brake drum, a one-piece sheet material ring member comprising a generally axially extending body having one margin thereof turned generally radially outwardly to provide a scoop portion, the opposite margin of the body having a circumferentially spaced series of retaining fingers of curled loop-like form projecting toward the radially inner side of the ring and with the free ends of the loops normally directed toward the radially inner surface of the ring, said retaining fingers being expansible and contractible and providing rounded retaining shoulders to project generally radially inwardly and adapted to snap into and conform with a groove in the periphery of a brake drum.

References Cited in the file of this patent

UNITED STATES PATENTS

| | | |
|---|---|---|
| 1,320,551 | Holley | Nov. 4, 1919 |
| 2,106,702 | Campbell | Feb. 1, 1938 |
| 2,265,938 | Eksergian | Dec. 9, 1941 |
| 2,326,788 | Lyon | Aug. 17, 1943 |
| 2,368,238 | Lyon | Jan. 30, 1945 |
| 2,489,522 | Chase | Nov. 29, 1949 |
| 2,599,707 | Gandelot | June 10, 1952 |
| 2,624,631 | Lyon | Jan. 6, 1953 |
| 2,795,302 | Gaylord | June 11, 1957 |

FOREIGN PATENTS

| | | |
|---|---|---|
| 511,014 | Italy | Jan. 24, 1955 |